3,205,036
PREPARATION OF CALCIUM DIHYDROGEN ORTHOSILICATE
Richard W. Mooney and Michael A. Aia, Towanda, Pa., assignors to Sylvania Electric Products Inc., a corporation of Delaware
No Drawing. Filed Apr. 17, 1962, Ser. No. 188,259
7 Claims. (Cl. 23—110)

This invention relates to an improved method of preparing orthosilicate of phosphor-grade-purity from inexpensive raw materials.

Calcium dihydrogen orthosilicate is known to the art and methods have previously been devised for the preparation of this material. In the past however, no practical method of preparing large quantities of calcium dihydrogen orthosilicate of high purity has been disclosed. Particularly, the material prepared according to the prior art was not useful as a starting material for a phosphor because its preparation inherently coprecipitated small quantities of phosphor contaminants. Since phosphors require high purity starting materials, even small amounts of certain impurities often tend to quench the luminous efficiency or shift the emission color. Our process substantially avoids the incorporation of impurities which are undesirable in the preparation of a phosphor.

The calcium dihydrogen orthosilicate prepared according to our invention is primarily used by us as a starting material for calcium silicate phosphors which may be activated possibly by tin, manganese and/or lead. Previous methods for preparing such phosphors involved mixing ultra-pure calcium carbonate and ultra-pure silicic acid together with oxides and/or fluorides of the metals desired for the activators. The mixture was slurried and pebble milled for several hours to achieve an intimate blend. Afterwards the blend was filtered and oven dried. To form the phosphor, this mixture was then placed in a boat or crucible and fired in an atmosphere of steam, hydrogen and nitrogen at temperatures ranging from 1900 to 2200° F. for 1 to 4 hours. To afford greater control, a more complex double-firing operation was often preferred to the single firing. An example of a prior art process for forming calcium silicate phosphors is disclosed in the United States Patent to Shaffer et al., No. 2,966,463.

Now when using calcium dihydrogen orthosilicate to prepare the phosphor, many of these time-consuming mixing steps are eliminated and the firing procedure can be markedly simplified. All that need be done is intermix the desired activator together with the calcium dihydrogen orthosilicate prepared according to our invention and fire once. The heating concurrently drives off chemically-combined water and incorporates the activator into the matrix. The necessity for using as a starting material costly, high-purity silicic acid and calcium carbonate required by other processes is eliminated. And yet, the phosphor is at least as bright as that prepared previously.

Accordingly, the primary object of our invention is the preparation of calcium dihydrogen orthosilicate of phosphor-grade-purity.

A feature of our invention is that the calcium dihydrogen orthosilicate precipitate has easily filterable particles of about 0.02 to 0.10 micron.

An advantage of our invention is that the calcium dihydrogen orthosilicate may be prepared from relatively inexpensive materials.

The many other objects, features, and advantages of our invention will become manifest to those versed in the art upon reading the following specification wherein specific embodiments of our invention are described by way of illustrative examples.

Briefly stated, our invention involves forming an alkali metal silicate solution and gradually admixing this solution with an acidified calcium chloride solution to form, while heated, a calcium dihydrogen orthosilicate precipitate. The supernatant liquid is then decanted and the precipitate is washed and removed by filtration. Drying removes uncombined excess water from the material.

Particularly, we form an alkali metal silicate solution, such as sodium or preferably, potassium silicate, by reacting silica gel or silicic acid ($SiO_2+xH_2O$) with an alkali in an aqueous media. Because of the presence of the hydroxide ions in the solution, we believe that the alkali metal metasilicate often called "water glass" is formed; however possibly other of the alkali metal silicates are also formed.

It is very important to maintain precise control over the concentrations of material used to prepare the alkali metal silicate solution. Variations in the ratio of silica gel to alkali metal, calculated and hereinafter referred to as a mole ratio of $SiO_2$ to alkali metal oxide, are allowable between about 0.75 and 1.0 mole $SiO_2$ per mole $K_2O$ or $Na_2O$. Below about 0.75, substantial excesses of the hydroxide ion are present and reaction with the silica gel will not be carried to completion, thus reducing the yield. At $SiO_2$/alkali metal oxide mole ratios above 1.0, the precipitate contains silica and above 2.0 most of the precipitate is colloidal silica. The presence of free silica is highly undesirable because it tends to intermix with calcium dihydrogen orthosilicate during precipitation of the latter material and is almost impossible to remove by conventional techniques. To produce an alkali metal silicate solution having the ratio of about 0.75 to 1.0, about 0.38 to 0.5 mole of silica gel should be reacted with about 1 mole alkali metal hydroxide. Of course, when an alkali metal oxide is used, the number of moles of silica used should be doubled to maintain the stoichiometry.

In Table I following, the effect of varying the ratio of $SiO_2$/alkali metal oxide is shown. As indicated, as soon as the ratio of $SiO_2$/alkali metal oxide is increased above 1.0, free silica appears in the X-ray diffraction pattern of the calcium dihydrogen orthosilicate.

TABLE I

| Mole ratio $SiO_2/K_2O$ in silicate solution | Mole ratio Si/Ca in precipitate | Free silica present by X-ray diffraction |
| --- | --- | --- |
| 0.9 | 1.00 | No |
| 1.0 | 1.00 | No |
| 1.1 | 1.08 | Yes |
| 1.9 | 1.82 | Yes |
| 3.9 | 3.80 | Yes |
| 4.5 | 5.76 | Yes |

Care must also be taken to maintain the materials and solutions substantially free of carbon dioxide. This is not only a requirement for the alkali metal silicate solution, but also for the calcium chloride solution. Unless special precautions are taken to substantially exclude carbon dioxide from all steps in the process, including the final drying, both residual silica and calcium carbonate are found in the precipitate. The exclusion is particularly important because of the strong tendency of the calcium dihydrogen orthosilicate to react with carbon dioxide to form calcium carbonate and silica, both of which are thermodynamically more stable. Their presence is detrimental to phosphor preparation where controlled chemical composition is desirable. Probably when carbon dioxide is present in the solution of alkali metal silicate and/or calcium chloride, calcium carbonate and free silica are produced because of a shift of equilibrium in the calcium dihydrogen orthosilicate-forming reaction.

After preparing the alkali metal silicate solution there are two possible procedures for mixing it with the calcium chloride. One procedure involves a slow addition of alkali metal silicate solution to calcium chloride of about 0.1 to 0.3 mole alkali metal silicate per mole $CaCl_2$ per hour, while the other procedure involves a faster and simultaneous intermixing of calcium chloride and alkali metal silicate of 0.4 to 0.8 mole alkali metal silicate per mole of $CaCl_2$ per hour.

Referring now to the slow addition, a 0.05 to 2.50 molar solution of alkali metal silicate having a $SiO_2/K_2O$ mole ratio of 0.75 to 1.00 is added to a boiling solution of 0.05 to 3.00 molar calcium chloride solution. The calcium chloride was previously purified by reaction with ammonium sulfide to remove residual heavy metals, such as iron, nickel, cobalt and lead. To remove carbon dioxide, the calcium chloride was acidified with hydrochloric acid to a pH of about 1 to 5. The calcium dihydrogen orthosolicate precipitate will then form in the mother liquor and can be readily removed by filtration.

The slow addition of alkali metal silicate to the calcium chloride is necessary in order to form crystals of 0.02 to 0.10 micron which are sufficiently defined for filtration and washing in conventional equipment. After the precipitate has settled, the supernatant liquid is decanted and the precipitate is filtered and washed. Thereafter, the calcium dihydrogen orthophosphate is dried at temperatures of 150 to 250° C.

In the simultaneous-addition procedure, alkali metal silicate and calcium chloride solutions in concentrations similar to those mentioned in the description of the slow addition procedure are simultaneously added to a tank. During addition, the solutions are kept at temperatures of 60 to 100° C. although higher temperatures, generally less then 150° C., can also be used. The rate of addition mentioned previously of 0.4 to 0.8 moles per mole $CaCl_2$ per hour is quite important in the simultaneous addition in order to obtain filterable particles of size 0.02 to 0.10 micron. Upon completion of the addition, the precipitate is allowed to settle, the supernatant liquid is decanted and the calcium dihydrogen orthosilicate washed, filtered, and dried. Both procedures produce substantially similar materials as indicated by the analytical data in Table II following:

TABLE II

*Comparison of precipitates produced by slow and simultaneous methods of addition*

[Analysis of precipitate]

| Method of addition | Drying temp. (° C.) | Percent Ca | Percent Si | Mole ratio Si/Ca | Impurities (p.p.m.) Heavy metals | Impurities (p.p.m.) Alkali metals |
|---|---|---|---|---|---|---|
| Slow | 225 | 31.2 | 21.9 | 1.00 | 30 | 50 |
| Do | 150 | 31.8 | 22.3 | 1.00 | 30 | 50 |
| Simultaneous | 140 | 30.1 | 20.5 | 0.97 | 50 | 50 |
| Do | 150 | 27.7 | 19.0 | 0.98 | 50 | 50 |

Phosphors of the type $CaSiO_3:Pb+Mn$ prepared by using the calcium dihydrogen orthosilicate according to our invention are compared in Table III to similar phosphors made from $CaCO_3$ and silicic acid. It will be seen that the material produced using calcium dihydrogen orthophosphate (entries 2 and 3) compares quite favorably with phosphors produced according to prior art methods (entry 1). The brightness of the phosphors in fluorescent lamp is almost equivalent to the prior art phosphor at 100 hours and is even brighter at 500 hours. Since the lead and manganese activated calcium metasilicate phosphor is red-emitting phosphor, the increase in red emission evidenced by entry 2 is quite advantageous.

TABLE III

| Mol Mn per mol. $CaSiO_3$ | Percent Red vs. Std. | Lumens and watts 100 hr. | Lumens and watts 500 hr. | Chromaticity co-ordinates x | Chromaticity co-ordinates y |
|---|---|---|---|---|---|
| 1. 0.06645 (Std.) | 102 | 1,650/42.1 | 1,574/39.8 | 0.509 | 0.394 |
| 2. .07 | 107 | 1,648/41.5 | 1,582/39.4 | .512 | .392 |
| 3. .06645 | 101 | 1,642/41.5 | 1,584/38.9 | .516 | .388 |

Without limiting the claims, the following specific examples of our invention are offered to illustrate various methods for forming the calcium dihydrogen orthosilicate.

EXAMPLE I

A potassium silicate solution, 2.0 molar in $SiO_2$ of a $SiO_2/K_2O$ mole ratio of 1.0 was prepared from technical grade potassium hydroxide (substantially $CO_2$ free) and silica gel. The solution was added very slowly (7 hours) to a boiling solution of 1.0 molar calcium chloride (previously purified with ammonium sulfide and acidified with HCl to drive off any residual $CO_2$). The reaction took place in a 200 gallon, glass-lined Pfaudler tank. The volume of potassium silicate solution was about 60 gallons, while that of the calcium chloride was about 140 gallons. A slight excess of calcium remained in the liquor at the end of precipitation.

The precipitate was then settled, decanted, and washed. Although the $CaH_2SiO_4$ filtered very well on a filter press, as soon as pressure was applied behind the cake to wash, it plugged the press. Rotary-vacuum filtering was the best way of handling the filtration, the filter cake being suspended again and again in water until a negative turbidity test for chloride was obtained with silver nitrate on the wash water. Six filtrations were required. The moisture content of the cake was about 90%. The material was then oven dried at 225° C.

EXAMPLE II

A solution of $K_2SiO_3$, 2.0 molar in $SiO_2$, was prepared as described in Example I above. A 2.0 molar solution of $CaCl_2$ was purified as described above. Both solutions were brought to a temperature of 85° C., then pumped simultaneously into a glass-lined Pfaudler tank, maintaining a slight excess of $CaCl_2$ in the tank at all times. The total precipitation time was 86 minutes. The temperature of the tank was maintained at 80 to 90° C. The technique was successful in both 10 gallon and later in 200 gallon equipment where boiling temperatures were used. Filtration and washing by repeated suspension in hot water followed each vacuum filtering.

While certain specific examples of the invention have been described in detail, the same are given as illustrations and not in order to limit the invention thereto. The scope of the invention is to be determined by the appended claims.

As our invention we claim:

1. A process for preparing high purity calcium dihydrogen orthosilicate, the steps which comprise: forming a solution of substantially carbon dioxide-free alkali metal silicate wherein the ratio of silicon to alkali metal, calculated as a mole ratio of silicon dioxide to alkali metal oxide respectively, is about 0.75 to 1.0, said alkali metal silicate solution being formed by reacting under carbon dioxide-free conditions alkali metal ions with silica gel; forming an acidified solution of calcium chloride, said solution having a pH between about 1 to 5 admixing said solution of alkali metal silicate with said substantially carbon dioxide-free acidified solution of calcium chloride at an elevated temperature and forming a precipitate of high purity calcium dihydrogen orthosilicate; recovering said precipitate and drying in a carbon dioxide-free atmosphere to remove excess water.

2. The process according to claim 1 wherein said alkali metal silicate solution is added to said calcium chloride at a rate of 0.1 to 0.3 mole alkali metal silicate per mole calcium chloride per hour.

3. The process according to claim 1 wherein said alkali metal silicate solution and said calcium chloride are simulataneously mixed together at a rate of 0.4 to 0.8 mole alkali metal silicate per mole of calcium chloride per hour.

4. A process for preparing high-purity calcium dihydrogen orthosilicate, the steps which comprise: admixing under carbon dioxide-free conditions about 2.0 to 2.7 moles of alkali metal ions with about 2 moles silica gel and forming an alkali metal silicate solution wherein the ratio of silicon to alkali metal, calculated as a mole ratio of silicon dioxide to alkali metal oxide, is about 0.75 to 1.0; admixing said alkali metal silicate solution with a 0.05 to 3 molar acidified solution having a pH between about 1 to 5 of substantially carbon dioxide-free calcium chloride at an elevated temperature and forming a precipitate of high purity calcium dihydrogen orthosilicate; recovering said precipitate and drying to remove excess water.

5. The process according to claim 4 wherein said alkali metal silicate solution is added to said calcium chloride at a rate of 0.1 to 0.3 mole alkali metal silicate per mole calcium chloride per hour.

6. The process according to claim 4 wherein said alkali metal silicate solution and said calcium chloride are simultaneously mixed together at a rate of 0.4 to 0.8 mole alkali metal silicate per mole of calcium chloride per hour.

7. The process according to claim 4 wherein the molarity of the alkali metal silicate solution is between about 0.05 to 2.5.

References Cited by the Examiner

UNITED STATES PATENTS

| | | | |
|---|---|---|---|
| 1,493,708 | 5/24 | Schneider | 23—110.1 |
| 2,636,807 | 4/53 | Ross et al. | 23—90 |
| 2,739,068 | 3/56 | Eichmeier | 23—110 X |
| 2,966,463 | 12/60 | Shaffer et al. | 252—301.4 |

MAURICE A. BRINDISI, *Primary Examiner.*